US009929908B2

(12) United States Patent
Ketheesan et al.

(10) Patent No.: US 9,929,908 B2
(45) Date of Patent: Mar. 27, 2018

(54) METHOD AND SYSTEM FOR OPTIMIZING A COMMUNICATION NETWORK FEATURE PRIOR TO IMPLEMENTING A NEW SERVICE

(71) Applicant: Tektronix, Inc., Beaverton, OR (US)

(72) Inventors: Kanapathipillai Ketheesan, San Francisco, CA (US); Marc Bensadoun, Berkeley, CA (US)

(73) Assignee: NetScout Systems Texas, LLC, Plano, TX (US)

( * ) Notice: Subject to any disclaimer, the term of this patent is extended or adjusted under 35 U.S.C. 154(b) by 26 days.

(21) Appl. No.: 14/796,180

(22) Filed: Jul. 10, 2015

(65) Prior Publication Data

US 2017/0012841 A1 Jan. 12, 2017

(51) Int. Cl.
*H04L 12/24* (2006.01)
*H04L 12/26* (2006.01)

(52) U.S. Cl.
CPC ...... *H04L 41/0823* (2013.01); *H04L 43/0823* (2013.01); *H04L 43/16* (2013.01)

(58) Field of Classification Search
None
See application file for complete search history.

(56) References Cited

U.S. PATENT DOCUMENTS

| 7,796,514 | B2* | 9/2010 | Noriega | H04L 47/10 370/230 |
| 2013/0142183 | A1* | 6/2013 | Lee | H04W 24/02 370/338 |
| 2015/0319768 | A1* | 11/2015 | Abdelmonem | H04L 5/006 455/452.1 |
| 2016/0135067 | A1* | 5/2016 | Morad | H04M 15/41 455/423 |
| 2016/0360436 | A1* | 12/2016 | Zhang | H04W 24/10 |

* cited by examiner

*Primary Examiner* — Jamal Javaid
*Assistant Examiner* — Saad Khawar
(74) *Attorney, Agent, or Firm* — Locke Lord LLP; Scott D. Wofsy; Christopher J. Capelli

(57) ABSTRACT

A method, device and system for method of optimizing a feature of a communication network prior to implementing a future service is provided. A plurality of network nodes in the communication network is assigned to a network cluster. At least one value for a respective key performance indicator (KPI) for data exchanged between the network nodes in the network cluster is determined, where the data is associated with a first communication service. And a need for an optimization of a feature of the communication network in response to the value for the KPI being outside of a range, prior to implementation of a second communication service is determined.

8 Claims, 3 Drawing Sheets

METHOD AND SYSTEM FOR OPTIMIZING A COMMUNICATION NETWORK FEATURE PRIOR TO IMPLEMENTING A NEW SERVICE

FIELD OF THE INVENTION

The present invention relates to communication network features and, more particularly, relates to methods of performing network analytics and optimizing a network feature on current network service prior to implementing a future service.

BACKGROUND OF THE INVENTION

With the development of mobile broadband communications, mobile telephony and voice services are ever evolving from third generation (3G) to long term evolution (LTE) services using the same communication networks. Prior to LTE services, voice data was transmitted using circuit switched (CS) networks, by contrast LTE services use Internet Protocol (IP)-based service and Voice over LTE (VoLTE) services are likely to become more prevalent. In short, an Evolved Packed Core (EPC) network may be required to handle traditional data services such as web browsing, video transfer/streaming, and applications, but also, such networks may be required to carry voice data.

Customers of wireless services have come to expect a certain level of performance from their service providers. In order to ensure consistent high quality of service, service providers employ network monitoring/network analytics software suites customized for the service providers. Ideally, service providers would like to be able to offer perfect communications service, free from dropped calls, corrupted video, or wait time (latency) between the time a cell phone user speaks and when a recipient hears the spoken voice. In order to ensure high quality of communications service, a service provider may need to install more cells/antennas, increase transmission power of the cells/antennas, or alter the beam properties of the transmitting antennas (e.g. beam width, azimuth, tilt, etc.) It is impossible to monitor and analyze yet-to-be implemented services to determine what problems, if any, will be encountered upon their respective launches.

Consumers of voice services generally prefer well operating systems characterized by few dropped calls and high scores in other Key Performance Indicators (KPIs), such as high Radio Access Network (RAN) Accessibility, high RAN Retainability, and high channel/voice quality. While it is desirable that carriers/voice service providers prioritize voice data so that there is little latency in messaging and few dropped calls, etc., there is a need to optimize networks prior to implementation of a future service.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect described is a method of optimizing a feature of a communication network, the method comprising: assigning, by a processor, a plurality of network nodes in the communication network to a network cluster; determining, by the processor, at least one value for a respective key performance indicator (KPI) for data exchanged between the network nodes in the network cluster, wherein the data is associated with a first communication service; determining, by the processor, a need for an optimization of a feature, parameter, or configuration of the communication network in response to the value for the KPI being outside of a range, prior to implementation of a second communication service.

The method may further comprise implementing, by the processor, the second communication service. The second communication service may be a Voice over Long Term Evolution (VoLTE) service. The feature may include one of Radio Frequency (RF) shaping, a handover parameter, an X2 parameter, an S1 parameter, a link level parameter, a system level parameter, Radio Resource Control (RRC) rejects and timeouts. And the KPI may include one of Radio Access Network (RAN) accessibility, RAN retainability, failed attempt rate, release-with-data-lost rate and dropped connection rate.

In another aspect, a computer program product for optimizing a feature of a communication network is disclosed. The computer program product includes one or more computer-readable storage devices and a plurality of program instructions stored on at least one of the one or more computer-readable storage devices. The plurality of program instructions includes program instructions to assign a plurality of network nodes in the communication network to a network cluster, to determine at least one value for a respective key performance indicator (KPI) for data exchanged between the network nodes in the network cluster, wherein the data is associated with a first communication service, program instructions to determine a need for an optimization of a feature, parameter or configuration of the communication network in response to the value for the KPI being outside of a range, prior to implementation of a second communication service. The plurality of program instructions may further includes program instructions to implement the second communication service.

In yet another aspect, a computer system for optimizing a feature of a communication network is disclosed. The computer system comprising one or more processors, one or more computer-readable storage devices, and a plurality of program instructions stored on at least one of the one or more storage devices for execution by at least one of the one or more processors, the plurality of program instructions comprising: program instructions to assign a plurality of network nodes in the communication network to a network cluster; program instructions to determine at least one value for a respective key performance indicator (KPI) for data exchanged between the network nodes in the network cluster, wherein the data is associated with a first communication service; program instructions to determine a need for an optimization of a feature of the communication network in response to the value for the KPI being outside of a range, prior to implementation of a second communication service.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
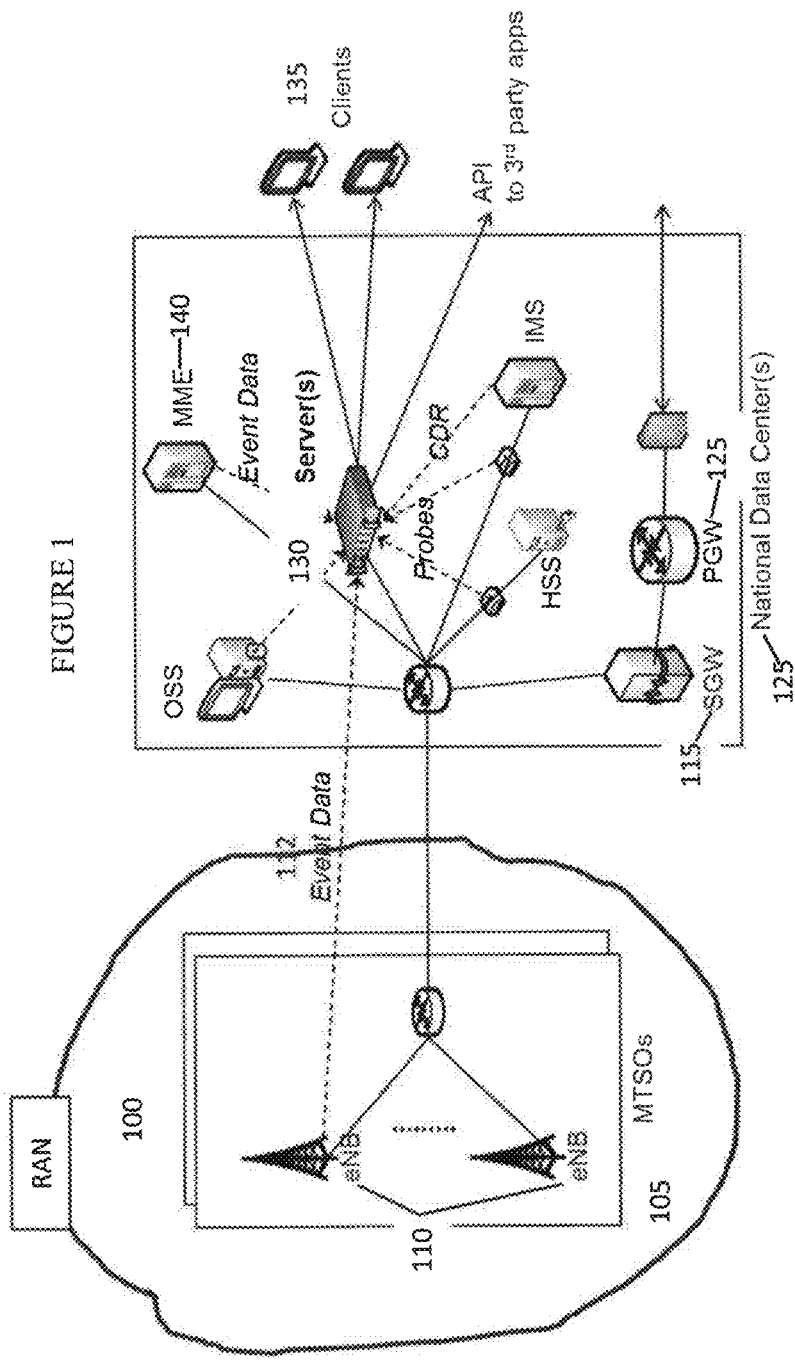
FIG. 1 illustrates an illustrative wireless communication system in which embodiments of the present invention may be implemented.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

The term "communication event", as used herein, refers to any incoming or outgoing communication to or from a mobile device or between network nodes. Communication events include mobile station attachment, detachment, handover procedures, voice calls, both sent and received, SMS messages both sent and received, e-mail correspondences both sent and received, and wireless application protocol sessions, video, chat, and others, among other data based transactions. Each communication event has at least two parties, the user of the mobile device and at least one correspondent element. The terms "mobile device" and "mobile station" may be used interchangeably herein. As used herein, movement of a mobile device includes movement of a car carrying the mobile device. The term "likelihood" may refer to a probability or chance of an event occurring, and may be expressed as a probability value, fraction, or percentage. The term "likelihood" as used herein may include the concept of a "probability" as used in mathematics and by persons of ordinary skill in the arts of statistical analysis.

New services are continually being added to communications networks, replacing previous services. For example service provider networks currently handle 3G and 4G traffic which replaced traffic of earlier services. Current communications networks generally do not handle Voice over Long Term Evolution (VoLTE) traffic since such service has not yet become adopted in the mainstream. VoLTE traffic differs from much other data traffic in that VoLTE carries only voice data. Unlike with most types of communication traffic, the amount of packet loss, jitter, error rate, etc., associated with VoLTE traffic drastically affects customer experience. For example, a webpage may load relatively slowly and a customer may be willing to accept that, but, a customer generally will not accept the same amount of delays, unwanted noise, etc. when making a phone call over VoLTE on the same network.

The present inventive concepts provide methods and systems of enhancing a network for an as-yet-to-be launched service while a current service is being supported and used. As a non-limiting example, the present inventive concepts include a proxy method of modeling VoLTE traffic over a given network that carries no VoLTE traffic and providing feedback regarding potential future network problems. In this illustrative method, such feedback may be useful in determining where to take corrective action(s) when needed/desired prior to the implementation of VoLTE service over the network. In general, however, embodiments of the present inventive concepts analyze existing traffic on a network where such traffic fits a profile for the traffic of a yet-to-be-implemented service, (e.g., non-VoLTE traffic that fits a VoLTE traffic profile). The inventive concepts may further include the use of injected VoLTE traffic, or injected traffic of the yet-to-be-implemented service into the analyzed network.

Embodiments provide for segmentation or breaking up of the service provider's network into clusters, and the analysis of traffic within at least one such cluster. While an aggregated approach (i.e., an aggregation of multiple clusters) is not described herein, one skilled in the art would understand that clusters may be aggregated and their associated networks may be altered after such aggregation.

The inventive concepts are drawn to a proxy method analysis for any yet-to-be implemented (or second) service on an existing network by using the existing network traffic as a proxy, as desired communication network performance criteria of the second service should be considered when determining whether optimizations of a network feature is desired or needed. For example, if the second service is a VoLTE service, then some criteria that would be desirable once the service is launched includes retainability of a long-lasting data connection (as such duration is typical of a voice call duration), packet loss rate (as such would represent quality of the voice on VoLTE), data session radio connection setup success rate (as such would represent future voice attempt success rate), etc.

Turning now descriptively to the drawings, in which similar reference characters denote similar elements throughout the several views, FIG. 1 depicts an illustrative wireless communication system in which illustrated embodiments of the present invention may be implemented.

FIG. 1 shows a conventional wireless communication system 100 having a at least one Mobile Telephony Switching Office (MTSO) 105 which include one scheduling nodes 110 (illustrated as evolved Node Bs (eNBs) 110) for scheduling transmission of event data 112 and for performing other network functions for network 100. Each eNB 110 contains signal processing equipment and an antenna for transmitting to and receiving signals from devices over the RF. In addition, it has terrestrial and other communications links to other eNBs 110 for managing mobility of devices and coordinating radio resources. Also shown are client devices 135 which receive and transmit data from network 100. Mobility Management Entity (MME) 140 is illustrated and may be a key control-node for an LTE access-network. The MME may be responsible for idle mode User Equipment (UE, e.g. client 135) paging, mobility management, and session management. It is be involved in the bearer activation/deactivation process and is also responsible for choosing the serving gateway (SGW) 115 for a UE 135 at the initial attach and at time of intra-LTE handover involving Core Network (CN) node (not shown) relocation.

The present inventive concepts are drawn to methods and systems for improving or optimizing a communication network prior to the launch or implementation of a future service. For example, network analytics using "best guess" or "best effort" services may be determined as a proxy for performance of an as-yet-to-be implemented service, e.g., Voice over LTE (VoLTE) traffic on the same network being analyzed. Through analysis of network traffic which closely resembles VoLTE traffic (e.g., model VoLTE traffic), segmenting portions of a network (i.e., a network "cluster"), and analyzing the model VoLTE traffic to yield various network analytics—key performance indicators (KPIs), and the like may be used to determine which, if any, features of the current network might need to be altered in order to ensure a properly running communication network(s) at the time of its implementation.

The wireless communication system 100 shown in FIG. 1 may comprise a radio access network (RAN). The RAN may be implemented in any combination of known or heretofore unknown radio access technology and network protocols. For instance, the RAN may comprise a combination of UMTS Terrestrial Radio Access Network (UTRAN), Wireless Local Area Network (WLAN), Digital Enhanced Cordless Technology (DECT), GSM EDGE Radio Access Network (GERAN), Worldwide Interoperability for Microwave Access (WiMAX) network, Device to Device (D-D), etc. The RAN can also be an aggregation of channels from multiple bands in the radio access technology LTE-A (Long Term Evolution—Advanced). LTE-A is a set of enhancements to the UMTS that includes an all-IP networking architecture and the ability of each base station to connect to multiple core networks.

Figure 2:
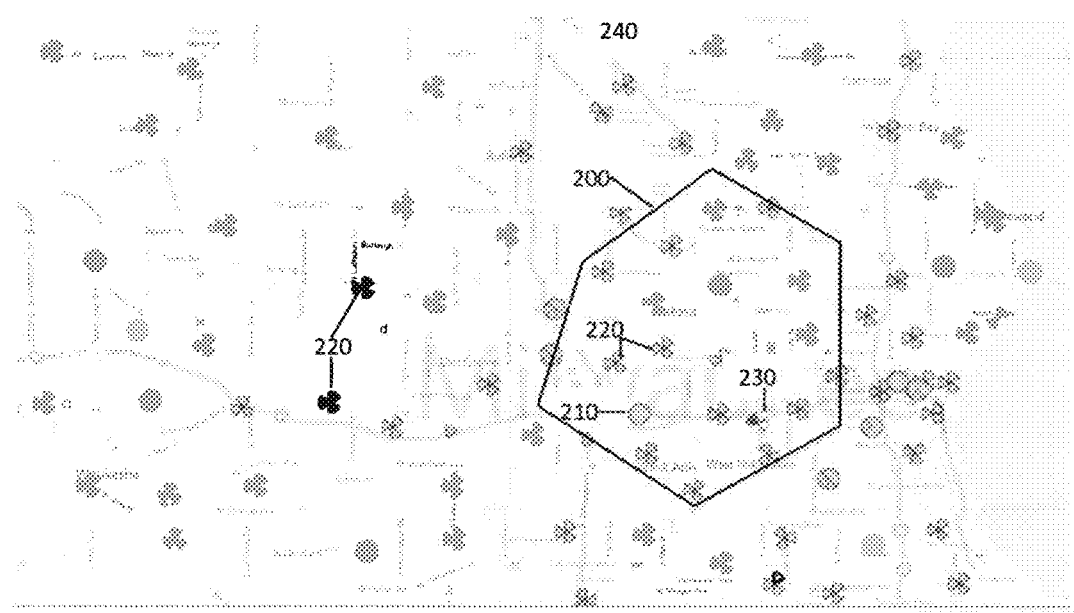
FIG. 2 is a diagram illustrating a cluster of nodes within a communication network, in accordance with an embodiment of the present invention.

FIG. 2 illustrates a cluster of nodes in a communication network. Cluster 200 is illustrated as a polygon including a plurality of different nodes 210, 220, 230 within a communication network 240. Nodes 210, 220 and 230 are illustrated as various shapes to convey that different types of communication devices may be used to transmit and receive data by the nodes 210, 220, 230 within the communication network 240, (for non-limiting examples, the nodes may include transmitters, receivers, transceivers and the like). One skilled in the art will understand that different types of communication devices may be used within communication network 240 and a description of different communication devices will be omitted for the sake of brevity.

Figure 3:
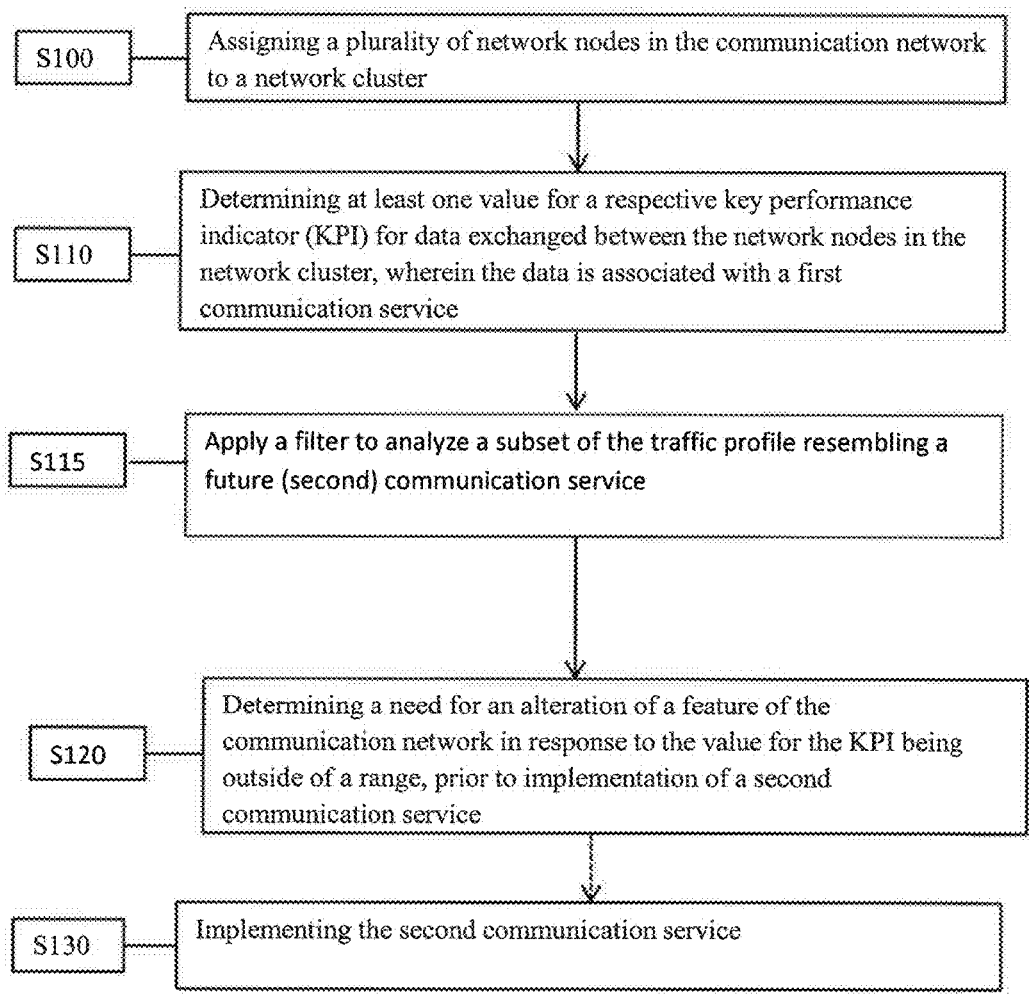
FIG. 3 is a flowchart of processes which may be performed in accordance with illustrative embodiments of the present invention.

FIG. 3 is a flowchart of operational processes which may be performed by devices in the communication system of FIG. 1 in accordance with illustrative embodiments of the present invention. Before turning to the description of FIG. 3, it is noted that the flow diagram in FIG. 3 illustrates example in which operational steps are carried out in a particular order, as indicated by the lines connecting the blocks, but the various steps shown in this diagram may be performed in any order, or in any combination or sub-combination. It should be appreciated that in some embodiments some of the steps described below may be combined into a single step. In some embodiments, one or more steps may be omitted. In some embodiments, one or more additional steps may be performed.

FIG. 3 illustrates a flow chart of processes that may be performed in a method of optimizing a feature of a communication network according to aspects of the present inventive concepts. A process that may be performed includes: assigning a plurality of network nodes in the communication network to a network cluster, S100. Such a cluster is illustrated in FIG. 2, as described above. The cluster may include network nodes that include different types of network elements, such as transmitters, receivers, transceivers, repeaters, servers and the like.

Another process that may be performed includes: determining at least one value for a respective key performance indicator (KPI) for data exchanged between the network nodes in the network cluster, wherein the data is associated with a first communication service, S110. Key Performance Indicators (KPIs) may include low Radio Access Network (RAN) Accessibility (e.g., less than about 5% or even less than about 2%), low RAN Retainability (e.g., less than about 5% or even less than about 2%), low failed attempt rate (e.g., less than about 5% or even less than about 2%), low Release with Lost Data Rate (e.g., less than about 5% or even less than about 2%), high first time call success rate, (e.g. greater than 98% or even greater than 99.9%) and low Dropped Connection Rate (e.g., less than about 5% or even less than about 2%). The KPIs may include ranges, rather than thresholds. Such a KPI may correspond to networks with calls made for calls made in networks having a Reference Signal Received Power (RSRP) of less than about −115 dBm, however other values are contemplated for RSRP. It is further to be appreciated the above described process may also analyze KPIs in a subset of traffic that is a closed profile to a future service, and then applying KPI to that subset. As shown in S115, a filter may be applied which is configured to analyze a subset of the data traffic having a profile that resembles a second (e.g., future) communication service prior to its implementation.

A further process may include: determining a need for an optimization of a feature of the communication network in response to the value for the KPI being outside of a range, prior to implementation of a second communication service, S120. Alternatively, the determination of a need for such an optimization may be made in response to a KPI falling below, or above a threshold. As a non-limiting example, a determination that an optimization of a network feature needs to be altered may be made in response to a dropped call rate being above a threshold, e.g., dropping greater than 2% of all calls made, or dropping greater than 2% of all calls that last longer than a certain amount of time, e.g., 90 seconds. The 2% threshold is given is merely illustrative, as is the length of time. Any threshold may be used as a determination point, as may any length of time or any other appropriate factor without deviating from the scope of the present inventive concepts. It should be noted that a need to alter a feature may be determined in response to a KPI falling outside of a range, as well as exceeding a threshold.

Once a needed or desired optimization of a network feature is performed, further processes may include: implementing the second communication service. As an example, a VoLTE service, which had not been in use on the communication network, may be launched after an optimization to a network feature is made. However, the second communication service may include other types of services than VoLTE. The optimization made may be made specifically to enhance the second communication service. For example, the second communication service may require a certain power level to be functional or to be functional at an acceptable level, e.g., exhibiting at least one desired KPI level. The feature altered prior to the implementation or launch of the second communication network service may, for example, enhance power output within the network. Once the feature is altered, the network may be configured to communicate data associated with the second service at an acceptable or optimal level immediately upon implementation of the second service. By optimizing a feature prior to launch of the second service, customer satisfaction may remain high and the launch of the second service may be unnoticeable by customers.

As another, more specific example, where VoLTE is the second communication service, the network feature that may be altered prior to implementation of VoLTE. Features that may be altered include Radio Frequency (RF) shaping (including antenna horizontal and vertical beamwidths, tilt, height, azimuth), a handover parameter, an X2 parameter, an S1 parameter, a link level parameter, a system level parameter, Radio Resource Control (RRC) rejects and timeouts, QoS configuration, eNB scheduler settings, backhaul provisioning, ECGI settings, ANR (Automatic Neighbor Relations) optimization, and DNS settings.

Optimization of RF shaping may be performed to alter the azimuth, tilt of a transmitter or antenna, optimization of transmitted power or optimizing beam width or other beam properties, as appropriate. Optimizations in handover parameters include optimizing A2 setting, A3 settings or optimizing timeouts. Further features that may be altered may include X2 and S1 parameters including ANR settings and neighbor lists. Link level and system level parameters may be altered, including various PHY and link layer parameters which affect drop rates or more expensive resources. Other features that may be altered may be described generally as functional features, e.g., features that have OEM dependencies, for example those associated with RRC rejects and timeouts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(/media) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the systems of the present inventive concepts may be implemented or executed by one or more computer systems. One such computer system, server 130 is illustrated in FIG. 1. In various embodiments, server 130 may be a server, a mainframe computer system, a workstation, a network computer, a desktop computer, a laptop, or the like.

Server 130 is only one example of a suitable system and is not intended to suggest any limitation as to the scope of use or functionality of embodiments of the invention described herein. Regardless, server 130 is capable of being implemented and/or performing any of the functionality set forth hereinabove. Server 130 is operational with numerous other general purpose or special purpose computing system environments or configurations. Examples of well-known computing systems, environments, and/or configurations that may be suitable for use with server 130 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Server 130 may be described in the general context of computer system-executable instructions, such as program modules, being executed by a computer system. Generally, program modules may include routines, programs, objects, components, logic, data structures, and so on that perform particular tasks or implement particular abstract data types. Server 130 may be practiced in distributed data processing environments where tasks are performed by remote processing devices that are linked through a communications network. In a distributed data processing environment, program modules may be located in both local and remote computer system storage media including memory storage devices. Server 130 is shown in FIG. 1 in the form of a general-purpose computing device. The components of server 130 may include, but are not limited to, one or more processors or processing units, a system memory, and a bus that couples various system components including system memory to processor.

A bus may include one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 130 typically includes a variety of computer system readable media. Such media may be any available media that is accessible by server 130, and it includes both volatile and non-volatile media, removable and non-removable media. System memory can include computer system readable media in the form of volatile memory, such as random access memory (RAM) and/or cache memory. Server 130 may further include other removable/non-removable, volatile/non-volatile computer system storage media. By way of example only, a storage system may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus by one or more data media interfaces. As will be further depicted and described below, a memory may include at least one program product having a set (e.g., at least one) of program modules that are configured to carry out the functions of embodiments of the invention.

A program/utility for implementing the methods of the present inventive concepts, may include a set (at least one) of program modules, may be stored in a memory by way of example, and not limitation, as well as an operating system, one or more application programs, other program modules, and program data. Each of the operating system, one or more application programs, other program modules, and program data or some combination thereof, may include an implementation of a networking environment. Program modules of the present inventive concepts may generally carry out the functions and/or methodologies of embodiments of the invention as described herein.

Server 130 may also communicate with one or more external devices such as a keyboard, a pointing device, a display, etc.; one or more devices that enable a user to interact with server 130; and/or any devices (e.g., network card, modem, etc.) that enable server 130 to communicate with one or more other computing devices. Such communication may occur via Input/Output (I/O) interfaces. Still yet, server 130 may communicate with one or more networks such as a local area network (LAN), a general wide area network (WAN), and/or a public network (e.g., the Internet) via a network adapter. A network adapter may communicate with other components of server 130 via a bus. It should be understood that although not shown, other hardware and/or software components could be used in conjunction with server 130. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of optimizing a feature of a communication network, the method comprising:
    assigning, by a processor, a plurality of network nodes in the communication network to a network cluster;
    determining, by the processor, at least one first key performance indicator (KPI) value for data exchanged between the network nodes in the network cluster, wherein the data is associated with a first communication service and wherein the first communication service is different from a Voice over Long Term Evolution (VoLTE) service;
    injecting second communication service traffic comprising VoLTE service traffic, prior to implementation of a second communication service, wherein the injected traffic is injected into the communication network exclusively for the purpose of testing performance of the second communication service within the communication network prior to implementation of the second communication service;
    determining, by the processor, at least one second KPI value for the injected second communication service traffic;
    determining, by the processor, a need for an optimization of a feature of the communication network in response to the second KPI value being outside of a pre-determined range; and
    optimizing the feature determined needed for optimization wherein the optimization includes one of a handover parameter, an X2 parameter, an S1 parameter, a link level parameter, a system level parameter, Radio Resource Control (RRC) rejects and timeouts to achieve a certain second KPI value for the network.

2. The method of claim 1, further comprising:
    implementing, by the processor, the second communication service.

3. The method of claim 1, wherein the KPI includes one of Radio Access Network (RAN) accessibility, RAN retainability, failed attempt rate, release-with-data-lost rate and dropped connection rate.

4. The method of claim 1, wherein the optimization further includes one of QoS configuration, eNodeB scheduler settings, backhaul provisioning, ECGI settings, ANR (Automatic Neighbor Relations) optimization and DNS settings.

5. A computer system for optimizing a feature of a communication network, the computer system comprising one or more processors, one or more computer-readable storage devices, and a plurality of program instructions stored on at least one of the one or more storage devices for execution by at least one of the one or more processors, the plurality of program instructions comprising:
    program instructions to assign a plurality of network nodes in the communication network to a network cluster;
    program instructions to determine at least one first key performance indicator (KPI) value for data exchanged between the network nodes in the network cluster, wherein the data is associated with a first communication service and wherein the first communication service is different from a Voice over Long Term Evolution (VoLTE) service;
    program instructions to inject second communication service traffic comprising VoLTE service traffic, prior to implementation of a second communication service, wherein the injected traffic is injected into the communication network exclusively for the purpose of testing performance of the second communication service within the communication network prior to implementation of the second communication service;
    program instructions to determine at least one second KPI value for the injected second communication service traffic;
    program instructions to determine a need for an optimization of a feature of the communication network in response to the second KPI value being outside of a pre-determined range; and
    program instructions to optimize the feature determined needed for optimization to achieve a certain second KPI value for the network wherein the feature to be optimized includes one of a handover parameter, an X2 parameter, an S1 parameter, a link level parameter, a system level parameter, Radio Resource Control (RRC) rejects and timeouts.

6. The computer system of claim 5, wherein the plurality of program instructions further comprises: program instructions to implement the second communication service.

7. The computer system of claim 5, wherein the KPI includes one of Radio Access Network (RAN) accessibility, RAN retainability, failed attempt rate, release-with-data-lost rate and dropped connection rate.

8. The computer system of claim 5, wherein the feature to be optimized further includes one of QoS configuration, eNodeB scheduler settings, backhaul provisioning, ECGI settings, ANR optimization and DNS settings.

* * * * *